(12) United States Patent
Hempel (10) Patent No.: US 9,793,733 B2
(45) Date of Patent: Oct. 17, 2017

(54) METHOD AND APPARATUS FOR CHARGING RECHARGEABLE CELLS

(71) Applicant: H-TECH AG, Schaan (LI)

(72) Inventor: Jörg Hempel, Bad Urach/Wittlingen (DE)

(73) Assignee: H-Tech AG, Schaan (LI)

( * ) Notice: Subject to any disclaimer, the term of this patent is extended or adjusted under 35 U.S.C. 154(b) by 68 days.

(21) Appl. No.: 14/361,838

(22) PCT Filed: Nov. 29, 2012

(86) PCT No.: PCT/EP2012/073994
§ 371 (c)(1),
(2) Date: May 30, 2014

(87) PCT Pub. No.: WO2013/079611
PCT Pub. Date: Jun. 6, 2013

(65) Prior Publication Data
US 2014/0327406 A1 Nov. 6, 2014

(30) Foreign Application Priority Data
Nov. 30, 2011 (DE) .................. 10 2011 087 496

(51) Int. Cl.
*H02J 7/00* (2006.01)
*H01M 10/44* (2006.01)

(52) U.S. Cl.
CPC ........... *H02J 7/0068* (2013.01); *H01M 10/44* (2013.01); *H01M 10/443* (2013.01);
(Continued)

(58) Field of Classification Search
None
See application file for complete search history.

(56) References Cited

U.S. PATENT DOCUMENTS 4,736,150 A * 4/1988 Wagner ................. H02J 7/0093
320/129
4,829,225 A * 5/1989 Podrazhansky ....... H02J 7/0093
320/129
(Continued)

FOREIGN PATENT DOCUMENTS

CN 1244307 A 2/2000
DE 4420249 A1 12/1995
(Continued)

OTHER PUBLICATIONS

International Search Report in corresponding PCT application No. PCT/EP2012/073994 dated Jun. 6, 2013.
(Continued)

*Primary Examiner* — Leigh Garbowski
(74) *Attorney, Agent, or Firm* — Maier & Maier, PLLC (57) ABSTRACT

A method for charging rechargeable cells, in particular lithium ion cells. An apparatus for charging such cells. In order to specify a method for charging a lithium-based cell and an apparatus for charging a lithium-based cell, in which the capacitance of the cell is optimally used, the charging time is drastically shortened, the shelf life of the cell is extended and/or it is possible to increase the capacitance of the cell, a method is stated which includes the following steps, pulsed charging of the cell, wherein the charging current $I_L$ exceeds the nominal charging current $I_{Lmax}$ of the cell during the charging pulses; and the cell is discharged between the charging pulses using load pulses.

15 Claims, 9 Drawing Sheets

(52) U.S. Cl.
CPC .......... *H02J 7/0008* (2013.01); *H02J 7/0029* (2013.01); *H02J 7/0093* (2013.01); *Y02B 40/90* (2013.01)

(56) References Cited

U.S. PATENT DOCUMENTS

| | | | |
|---|---|---|---|
| 5,481,174 A | 1/1996 | Martin et al. | |
| 5,694,023 A * | 12/1997 | Podrazhansky | H01M 10/44 320/129 |
| 5,998,968 A * | 12/1999 | Pittman | H02J 7/0093 320/130 |
| 6,097,172 A * | 8/2000 | Podrazhansky | H02J 7/0093 320/107 |
| 6,137,265 A * | 10/2000 | Cummings | H02J 7/0004 320/133 |
| 6,232,750 B1 * | 5/2001 | Podrazhansky | H02J 7/0093 320/139 |
| 6,259,231 B1 * | 7/2001 | Hansen | H02J 7/0093 320/131 |
| 6,307,379 B2 * | 10/2001 | Podrazhansky | G01R 31/362 320/132 |
| 6,320,354 B1 * | 11/2001 | Sengupta | H01M 10/44 320/132 |
| 6,366,056 B1 * | 4/2002 | Podrazhansky | H02J 7/0093 320/141 |
| 6,388,425 B1 * | 5/2002 | Petrovic | H02J 7/0093 320/130 |
| 6,445,161 B1 * | 9/2002 | Papiska | H01M 10/44 320/130 |
| 6,476,585 B1 * | 11/2002 | Simmonds | H02J 7/022 320/134 |
| 6,563,318 B2 * | 5/2003 | Kawakami | G01R 31/3679 320/132 |
| 6,661,201 B2 * | 12/2003 | Ueda | B60L 11/185 320/131 |
| 6,885,169 B2 * | 4/2005 | Dobbie | H01M 10/44 320/141 |
| 6,954,051 B2 * | 10/2005 | Trinh | H02J 7/0081 320/145 |
| 7,301,307 B2 * | 11/2007 | Hansen | H02J 7/0068 320/139 |
| 7,375,491 B2 * | 5/2008 | Lin | H02J 7/0073 320/107 |
| 7,541,778 B2 * | 6/2009 | Maleus | H01M 10/44 320/140 |
| 7,696,723 B2 * | 4/2010 | Sato | H02J 7/0047 320/132 |
| 7,786,706 B2 * | 8/2010 | Yamashita | H01M 10/44 320/130 |
| 8,427,166 B2 * | 4/2013 | Tsenter | G01R 31/3679 324/426 |
| 8,436,587 B2 * | 5/2013 | Aanensen | H02J 7/0075 320/139 |
| 8,638,070 B2 * | 1/2014 | Maluf | H02J 7/0052 320/141 |
| 8,791,669 B2 * | 7/2014 | Ghantous | G01R 31/3637 320/139 |
| 9,035,621 B2 * | 5/2015 | Berkowitz | G01R 31/3637 320/134 |
| 9,065,292 B2 * | 6/2015 | Yazami | H02J 7/0081 |
| 9,136,723 B2 * | 9/2015 | Izumi | B60K 6/365 |
| 2011/0285356 A1 | 11/2011 | Maluf et al. | |
| 2015/0380957 A1 * | 12/2015 | Ghantous | H02J 7/0052 320/134 |

FOREIGN PATENT DOCUMENTS

| | | |
|---|---|---|
| DE | 60119565 T2 | 1/2007 |
| JP | 8-241735 A | 9/1996 |
| JP | 2007-318913 A | 12/2007 |
| JP | 2009-214766 A | 9/2009 |
| WO | 97/32384 A1 | 9/1997 |
| WO | 98/31088 A2 | 7/1998 |
| WO | 03/055033 A1 | 7/2003 |

OTHER PUBLICATIONS

Japanese Office Action dated Sep. 11, 2015, in connection with corresponding JP Application No. 2014-543895 (11 pgs., including English translation).

Chinese Office Action dated Nov. 23, 2015, in connection with corresponding CN Application No. 201280058911.9 (7 pgs., including English translation).

Chinese Office Action dated Aug. 8, 2016, in connection with corresponding CN Application No. 201280058911.9 (9 pgs., including English translation).

* cited by examiner

METHOD AND APPARATUS FOR CHARGING RECHARGEABLE CELLS

The invention relates to a method for charging rechargeable cells, in particular lithium ion cells or lithium-based cells. Moreover the present invention relates to a device for charging such cells.

Reorientation in the production of electrical energy based on regenerative energy sources, in particular by means of photo-voltaics or wind power, increasingly requires efficient storage of the generated energy in order to have stored electrical energy available as and when needed.

In addition there has been a distinct increase in the number of portable and battery-operated devices which are driven by rechargeable batteries or cells, in particular for communication and in the building trade. With these devices the capacity of rechargeable batteries represents an essential functional feature. The factors influencing the capacity of rechargeable cells are, on the one hand, the geometric size which is traditionally achieved by an enlargement of the geometric dimensions of the cells or the battery. On the other hand the durability or number of maximum possible charging cycles plays a big role since with usual battery-operated devices the battery or cell is the first to fail, i.e. when it comes to the durability of the components of such devices the rechargeable batteries or cells are among those with the shortest service life.

Also characteristics like capacity, durability and charging time of rechargeable cells/batteries/storage modules are particularly important when it comes to accepting new technologies in the very quickly developing field of E-mobility with hybrid or electric vehicles. Here too the geometric dimensions and the weight of rechargeable cells play a very important role.

During recent months the lithium-ion-cell has proven to be particularly advantageous among rechargeable cells since it has a long lifespan with the number of charging cycles being high compared to other technologies. Lithium-ion-cells also have a high storage capacity compared to other rechargeable cells.

With lithium-ion-cells the cell is discharged to up to 30% of its capacity depending on the design, in other words 30% of the intrinsic energy stored in the cell is not available to the user since discharging the cell to below the threshold of 30% would lead to an irrevocable destruction of the lithium-ion-cell. If a cell is discharged to below this threshold, ions can become detached from the electrode material (Cu, Al), thereby destroying the electrode.

In addition, a cell containing today's lithium-ion-cells is charged to no more than 80% of its capacity since if the cell were charged to 100% this would take exponentially more time, because the current is normally subjected to a limit when reaching the end-of-charge voltage, whereby the last 20% of capacity is charged at a lesser amperage so that in terms of time less energy is stored or loaded into the cell.

Thus with traditional technologies for rechargeable cells the intrinsic capacity of the cell is not utilised.

The U.S. Pat. No. 5,481,174 describes a method for charging lithium-ion cells, in which a positive and a negative pulse is used, wherein after reaching a pre-set maximum voltage the height of the positive current pulses is reduced resulting in a long charging process.

Based on this situation it is the requirement of the invention to propose a method for charging a lithium-based cell/a device for charging a lithium-based cell, with which the capacity of the cell is optimally utilised, die charging time is drastically shortened, the durability of the cell is prolonged and/or an increase in capacity of the cell is made possible.

The invention is based on the idea of charging a rechargeable cell or battery faster and/or more fully than is traditional. To this end a charge-preparing phase is provided in which the rechargeable cell is prepared or activated for the pulse-charging phase. To achieve the above-mentioned targets the inventive charge-preparing phase may be the only one required. Equally, to achieve the above mentioned targets, the pulse-charging phase may be the only phase required.

The inventive pulse-charging phase will now be initially described in detail. During the pulse-charging phase a pulsed charging process is used, in which the cell is charged with a charging current $I_L$, which exceeds the admissible nominal charging current $I_{Lmax}$ of the cell. The pulsed charging current $I_L$, is composed of positive pulses and negative pulses. The pulsed charging method is described with respect to the current. The associated voltage characteristic is explained with reference to the figures. The negative pulses constitute a defined load on the cell, in other words, the cell gives off energy or a current flows in the opposite direction. Whilst the positive pulses are called charging pulses, the negative pulses may be called load pulses or stress pulses. The term reverse pulse is also used sometimes.

Due to applying a charging current which is higher than the admissible nominal charging current, storing of the energy in the cell takes place at a faster rate than when applying the nominal charging current. As a result more ions are transported from one electrode to the other during charging, which then migrate back when a load is applied.

If the storing of energy with a charging current which is higher than the admissible nominal charging current were carried out continuously over a longer period of time, the cell would heat up and the safety mechanisms (PTC, melt fuse, degassing valve, balancer) would interrupt such a charging process. Continuous charging has the effect that dendrites built up continuously on the electrodes which on the one hand increases the internal resistance of the cell causing the voltage at the cell to rise. On the other hand, due to the growing number of dendrites, the number of possible charging cycles is reduced.

According to the invention, however, it is proposed to have a load pulse following a charging pulse. During this load pulse the current in the cell flows in the opposite direction because the cell again releases energy. Thus the remanence accumulated during the charging pulse is diminished during the following load pulse. The load pulse has the effect of removing dendrites or crystals which accumulate during the charging pulse. The crystals or dendrites may lead to the separator in the cell between cathode and anode being punctured which in the worst case would lead to a short circuit. The load pulse causes the accumulated crystals to be repeatedly removed. Therefore the cell during the next charging pulse can be charged with a higher charging pulse than the admissible charging pulse without it becoming overheated. The higher charging current during the positive pulse causes more energy to be stored in the cell than with conventional charging methods. The following load pulse counteracts the constant formation of dendrites, allowing the cell to be charged again with a higher charging current. The height of the load pulse is less than that of the charging pulse, or in other words, the absolute amperage during the load pulse is smaller. Thus the channels in the separator are flushed out for ion exchange, whereby however, due to the higher charging current an increasing amount of energy remains in the cell.

Due to the short high charging currents according to the invention and the subsequent load pulses the separator is formatted. On the one hand this prevents an uneven distribution or deposition of the lithium on one of the electrodes. In addition due to the short charging pulses and load pulses the temperature of the cell is prevented from rising. Since the pulses are short in both current directions, the temperature at the electrodes cannot rise. In addition a possible rise in temperature at the electrodes can reduce again in the time between the pulses. A rise in temperature would entail an uneven resistance distribution at the electrodes ultimately resulting in an uneven deposition of the lithium at the electrodes.

In a cell the terminal lugs are normally arranged diagonally to each other, i.e. the line resistances in the electrodes are different, in particular in a wound cell. For long and low charging currents, a. o. also for slowly pulsed charging currents, the lithium ions try to migrate in direction of the smallest resistance, i.e. they try not to take the shortest route to the opposite electrode, but to migrate directly to the oppositely poled terminal lug. This however would have the effect of the lithium being unevenly deposited on the electrodes. An uneven deposition of the lithium on the electrodes however leads to a reduction in the lifespan and a reduction in the capacity of the cell since the whole of the electrode surface is no longer available for chemical reaction.

However, due to the short charging pulses with increased charging current and also due to the load pulses the ions do not have the time to look for a path with the shortest resistance and must choose the shortest route between the electrodes, the entire electrode length being thus available for ion exchange and the deposition of the lithium remaining evenly distributed between the electrodes.

Preferably the charging current during the charging pulses is more than 1.5 times the nominal charging current of the cell, for example twice the nominal charging current or more. Charging currents are possible which exceed the nominal charging current by more than 5 times. The charging current supplied during the pulse-charging phase or the discharging current is limited only by a PTC in both current flow directions, the conductivity of which is dependent on the temperature. Depending on the design of the cell the PTC is configured such that it corresponds to 5 times or 10 times that of the nominal charging current. The PTC would interrupt the current flow if a stronger current were flowing.

After a certain charging time and correspondingly many charging pulses the voltage $U_Z$ at the cell exceeds the end-of-charge voltage $U_{Lmax}$ during the charging pulses. With conventional cells the current would now be limited, such as is the case with the U.S. Pat. No. 5,481,174. According to the invention however, the charging current is not limited when the end-of-charge voltage $U_{Lmax}$ is reached. In other words the voltage at the cell rises further beyond the end-of-charge voltage $U_{Lmax}$ and the level of the charging current is maintained during the charging pulses. With conventional charging methods the current is limited when approx. 80% of the capacity of the cell is reached, because then the maximum end-of-charge voltage $U_{Lmax}$ has already been reached. An increase in voltage beyond the maximum end-of-charge voltage $U_{Lmax}$ is achieved by the short and high charging pulses and the load pulses, since in particular due to the short strong pulses the temperature of the cell is not increased, thereby counteracting an uneven distribution of the resistances of the electrodes/an uneven distribution of the lithium deposition on the electrodes.

Preferably the cell is discharged between positive charging pulses by means of a load pulse. As already described this causes removal of the dendrites formed. But other charging patterns are also possible, where between two load pulses a pause occurs and another load pulse does not occur until after two or more charging pulses. However, this has an influence upon the charging time because then the charging current between the charging pulses cannot be chosen as high as if a load pulse would follow between all charging pulses.

In a preferred embodiment the height of the charging pulses and/or the height of the load pulses is dependent on the state of the cell, in particular the internal resistance of the cell. In other words, the height of the load pulse can increase as the charge state increases in order to remove remanence. Due to the adaptive arrangement of the height of the charging pulses/the load pulses it is possible to react to peculiarities during the charging operation, such as to external temperature influences. Similarly deviations from the voltage trends during the charging pulses and/or load pulses may occur which are caused by an uneven deposition of the lithium or a short-term heating-up of the electrodes.

In order to assess the state of the cell a voltage measurement at the cell is performed during at least one load pulse and/or charging pulse. Since a voltage measurement at the cell must be carried out under load in order to draw a realistic conclusion on the state of the cell, the voltage is measured during the load pulses. It is especially advantageous if the voltage is measured at the end of the load pulse since then the most stable state of the cell is reached. In other words, the voltage is measured at a point in time before the load pulse leaves its maximum and before the current flows in direction 0. A voltage measurement without load may result in voltage values which can no longer be achieved in the load state since then the voltage rises extremely and the current collapses. For better control of the charging pulses and/or load pulses and in particular the height or duration of the pulses it is advantageous to measure the voltage of the cell also during the charging pulse, in particular in order to detect voltage deviations in upward direction.

Preferably a discharging current of max. 20-25% of the charging current flows during a load pulse. The result of this is that during the load pulse the energy withdrawn from the cell is no more than was stored in it during the charging pulse.

The level of the charging current in consecutive charging pulses may vary, i.e. it is adapted respectively to the state of the cell, wherein here a voltage measurement and/or a temperature measurement, for example, may be used for recording the state.

In addition the level or size of the discharging current may vary in consecutive load pulses.

If the voltage measurement, during the charging pulse, shows a voltage increase, this indicates an irregularity during charging which may be caused by an increased accumulation of dendrites resulting in an increase in internal resistance of the cell. In order to counteract this voltage increase, the height of the next charging pulses may be reduced relative to the previous charging pulses. In other words, if the voltage at the cell rises abruptly, the current in the last charging pulse is reduced. Preferably a reduction of approx. 50% is made so that for a charging current twice as large in the previous charging pulse, charging is now effected for a charging pulse with only a one-time as large admissible charging current.

Preferably the load pulse following the reduced charging pulse may also be reduced by 50% in comparison to the previous load pulse. From the voltage measured during the load pulse can be derived, whether the next positive charging pulse must also be reduced or can be carried out again with increased charging current. If the voltage during the load pulse with reduced load is again in the predefined tolerance range, the next positive charging pulse can again be carried out with the previously applied increased charging current. Then the next load pulse can also be effected with the previously applied load, in order to discharge the cell in the short-term and to prepare it for the next positive charging pulse with increased charging current.

The voltage of the cell may rise, for example, because of a defect PTC or if the internal resistance of the cell is becoming too high because of an overheating of the electrodes. Then preferably both the charging pulses and the load pulses are reduced until the voltage of the cell has returned to the predefined voltage trends.

In as preferred embodiment a voltage measurement is carried out in all discharging pulses.

Preferably the length of the load pulse corresponds to approx. half the length of the charging pulse. In this way it is ensured that not only is a higher current supplied during the charging pulses than during the load pulse, but during the charging pulse the higher current is supplied for longer than during the load pulse during which energy is withdrawn from the cell. However, ratios of 2/3 for the charge pulse and 1/3 for the load pulse are possible. The load pulse must not be chosen too long because otherwise charging of the cell is unnecessarily prolonged. In a preferred embodiment the times of the pulses/their respective ratios can be adjusted.

In a further preferred embodiment charging of the cell is terminated when for a predefined number of load pulse the voltage measured corresponds to the end-of-charge voltage of the cell.

It is especially advantageous if the last load pulses prior to reaching a 100% charge of the cell are greater by approx. 25% than the previous load pulses since for a rising voltage the remanence of the cell increases which then must be removed with a greater load pulse.

Additionally or alternatively the current of the next charging pulse is reduced if the voltage during the load pulse reaches the end-of-charge voltage. Preferably the next charging pulse is halved, this for so long until for the next load pulses the end-of-charge voltage remains stable. Then the cell is charged to almost 100%.

With all method steps it is advantageous to continuously or periodically measure the temperature of the cell. This gives further information whether the cell to be charged will behave normally during charging. As long as the temperature lies below predefined limit values, the charging process continues. A rise in temperature below predefined limit values can be counteracted by reducing the height or duration of the charging pulses and/or load pulses. The temperature should be monitored at least during the charging pulse/the load pulse. If a predefined temperature ($T_{max}$) is exceeded for a predefined time, for example 45° C., for one or more charging pulses the charging operation of the cell is aborted. The critical temperature for both high-energy cells and high-current cells is 47-48°.

Additionally or alternatively the voltage of the cell is measured continuously or periodically during charging, in order to obtain further information on the state of the cell, wherein if a predetermined voltage of the cell is exceeded the charging operation is aborted or interrupted. Should the voltage at the cell rise beyond the predetermined voltage of the cell, the cell comprises an irregularity, which may be taken into account during further charging, either by adapting the charging current level/load current level or, in an extreme case, by aborting the charging process or by interrupting it in order to cool the cell.

So far the charging process has been described only with reference to the pulse charging phase. With the pulse charging phase described above enormous time savings during charging a cell can be achieved on the one hand, whilst on the other, the cell can be charged to 100% of its capacity within a short time because on reaching the maximum end-of-charge voltage the charging current is not reduced and even when the maximum end-of-charge voltage is exceeded, the size of the charging current is maintained during the charging pulses. As such it is possible with the charging method according to the invention, to charge 100% of the capacity of the cell within 20% of the normal charging time without the cell heating up or being permanently damaged. By rapidly switching between high charging pulses and load pulses the temperature of the cell is prevented from rising so that the resistances of the electrodes also remain the same thus counteracting an uneven distribution of the lithium.

The charge-preparing phase described below is used to activate the cell. It is of particular importance for slowly preparing a deep discharged cell to the pulse charging process. But even applying the charge-preparing phase on its own leads to improvements during charging of Li cells.

Batteries are usually composed of several cells which are connected in parallel or on series. In batteries or power packs of this kind a balancer is provided which normally prevents deep discharging of the cells. With conventional cells a cell is said to be "discharged" if it still contains 30% of its capacity. If cells are discharged to deeper than 30%, this is called "deep discharge". This may occur due to a defective balancer or if cells are loaded at extremely low temperatures or are stored in a discharged state at very low temperatures.

The charge-preparing phase is carried out prior to the pulse-charging phase. The charge-preparing phase includes, among others, a first measurement of the voltage of the cell without load, i.e. without having previously supplied current. If the cell shows no voltage, the conclusion must be drawn that the cell is defective. Depending on the measured voltage the charging current level is now set. The charging current level during the charge-preparing phase is limited for the first rising phase of the maximum nominal charging current level. Further the rise/the time is set, in which the charging current shall rise from zero or a low initial value to the specified charging current level. If the voltage measurement shows a very low voltage, 50% of the nominal charging current should typically be applied during the first rising phase. The less the voltage, the longer the time for the first rising phase should last, i.e. the rise of the charging current is less for a low voltage.

Then follows charging of the cell with the specified charging current within a first rising phase up to the set charging current level, e.g. 1 A for the predefined time, e.g. 1 min, wherein the charging current corresponds, at its maximum, to the nominal charging current of the cell. This charging is used to activate the cell so that the ions start slowly to migrate from one electrode to the other.

After reaching the set charging current level there is a pause without charging current being supplied. The voltage of the cell can be measured as early as at this point. Then the voltage of the cell is measured for a predefined load. The predefined load is similar or equal to a load pulse in the pulse-charging phase. Additionally a pause without current supply may be inserted prior to and/or after the load pulse, in order to measure the voltage.

Depending on the voltage of the cell measured under load the first rising phase is repeated. A repeat is important if the voltage under load does not yet show the desired value. For example, the first rising phase is repeated if the end-of-discharge voltage of the cell is not yet reached after the first rising phase. This first rising phase with a charging current which corresponds, at its maximum, to the nominal charging current can be repeated several times depending on the type of cell and the state of the cell.

When the cell under load comprises a voltage which lies above the end-of-discharge voltage by more than 5%, a second rising phase can preferably be carried out, where the cell is charged, linearly rising, up to a predefined charging current which is higher than the nominal charging current. For example the cell may be charged up to double the nominal charging current during the second rising phase. The voltage of the cell is then measured under load again at the end of this second rising phase. If a voltage is now reached which comprises a predefined value where the cell is suitable for undergoing the pulse-charging phase, the charge-preparing phase is terminated. If the end-of-discharge voltage has been reached after one or several first rising phases, the second rising phase may be omitted.

The requirement is also met by a device for charging a cell, wherein the device comprises a controller which is adapted to carry out the above-described process.

Examples of the invention will now be described with reference to the figures, in which.

Figure 1:
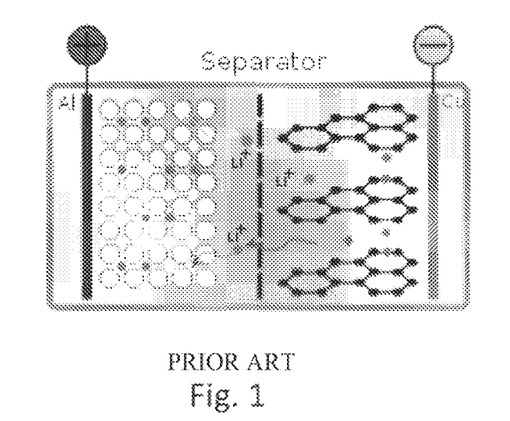
FIG. 1 shows the construction of a commonly used lithium-ion cell.

FIG. 1 schematically shows the construction of a lithium-ion cell comprising a cathode and an anode. During the charging operation lithium-ions migrate from the positive electrode to the negative electrode which for example is coated with lithium graphite. During the discharging operation the lithium-ions migrate from the negative electrode back to the positive electrode. The two electrodes are separated from each other by a separator, wherein the lithium-ions migrate through this separator.

Lithium-ion cells compared to other rechargeable cells are characterised in that they have no memory effect and self-discharge is very low. The usual end-of-charge voltage of lithium-ion cells is approx. 4.2V, based on a nominal voltage of 3.6V. Lithium-ion cells, for example, include lithium polymer cells, lithium iron sulphate cells, lithium graphite cells and lithium cobalt cells.

Figure 2:
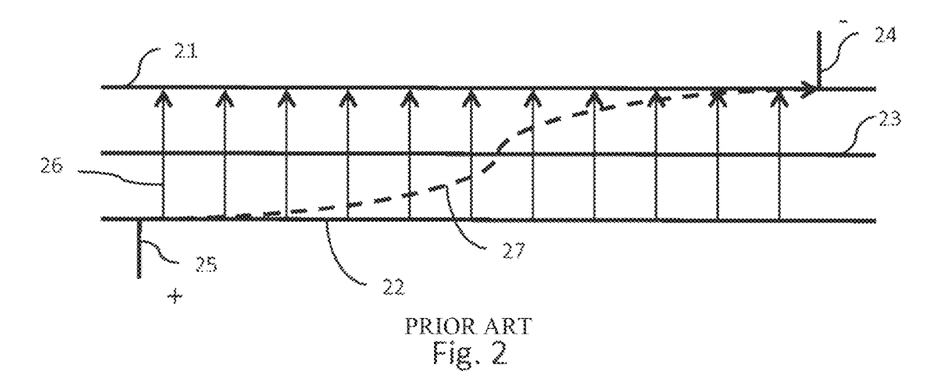
FIG. 2 shows a lithium-ion cell in a wound state.

FIG. 2 shows a lithium-ion cell in a wound state. The anode 21 and the cathode 22 lie opposite each other and are separated from each other by a separator 23. The terminal lugs 24 and 25 on the electrodes 21 and 22 lie diagonally opposite each other. That is, the electrical resistance in the electrodes increases as the line length increases. Thus the electrical resistance in the electrodes grows as the distance to the terminal lug increases. Therefore the lithium-ions endeavour to take the path of the least electrical resistance as they migrate from the positive to the negative electrode, which resistance, however, is not formed by the electrode directly opposite, but is located through the cell between the electrodes (indicated with 27). Due to the short charging pulses with a charging current $I_L$, which is higher than the nominal charging current $I_{Lmax}$ of a cell, the lithium-ions are urged to the other electrode without having time to look for a path with the least electrical resistance. As a result the separator 23 is formed up thus permitting a uniform ion exchange between the two opposite electrodes 21 and 22. In addition due to the charging pulse as well as the load pulse being limited over time, the temperature of the electrodes 21, 22 is prevented from rising which otherwise would cause an increase in the internal resistance of the electrodes which in turn would lead to an uneven resistance distribution causing a further rise in the temperature of the electrodes on the one hand and a change in the lithium distribution within the cell on the other, leading to an uneven distribution of the lithium deposition. An uneven deposition of lithium would lead to no longer having a complete chemical reaction surface available between the electrodes, thereby reducing the maximum possible charging cycles. On the other hand, if the lithium deposition were to grow unevenly on one of the electrodes, the separator would be reached at some time and be punctuated causing a short circuit. The short charging pulses or load pulses have the effect of counteracting this, wherein prevention of an excessive rise in temperature is especially important. The reference symbol 27 shows a path of the lithium-ions which try to take the path of the least electrical resistance. If the cell were not charged/discharged with the short high charging pulses or load pulses, the lithium-ions would try to take the path represented by the reference symbol 27, which would lead to an uneven distribution of the lithium deposition on the electrodes.

Figure 3:
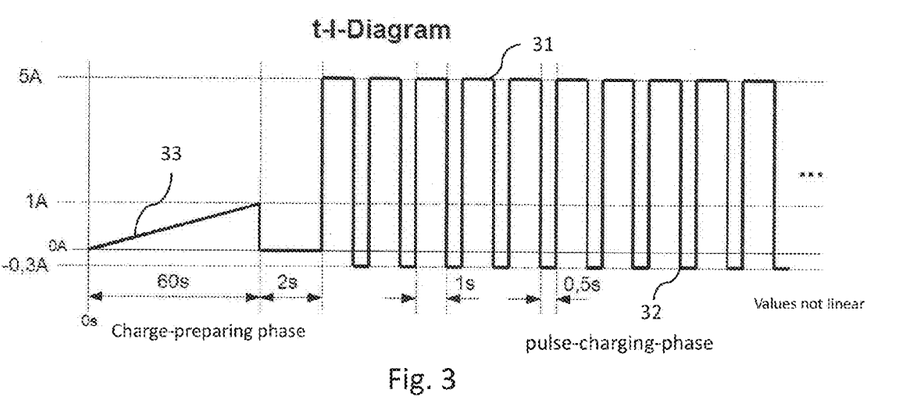
FIG. 3 shows a schematic current signal characteristic of a charging method according to the invention for a high-energy cell.

FIG. 3 shows a signal characteristic over time for a charging method according to the invention with a charge-preparing phase and a pulse-charging phase. The charging method shown here is exemplary for a high-energy cell with a capacity of 2.3 Ah.

With this charging method the cell is charged during the charge-preparing phase comprising a first rising phase 33 with a charging current rising from 0 to 1 A within one minute. After this one minute the charging operation is stopped for a duration of 2 s, i.e. the cell is no longer supplied with a charging current, wherein the voltage of the cell is measured at first without and then with a predefined load. After 2 seconds have passed and a voltage above the end-of-discharge voltage of 3.0V has been measured, the charge-preparing phase is finished and the pulse-charging process can begin.

In the pulse-charging phase the pulse duration of the positive charging pulses 31 is initially 1 s, wherein the duration of the load pulses 32 is 0.5 s. During the load pulses 32 the cell is subjected to a load of 300 mA, wherein the voltage $U_Z$ of the cell is measured within a load pulse 32. If the voltage during this load is more than 4.2V the charging operation is finished.

Within the cell the following happens during the charging operation according to the invention: the crystals being created inside the cell during the charging pulses 31 damage the separator 23 of the cell, whereby this would lose both charge and capacity. Moreover the crystals obstruct the movement of ions between the electrodes 21, 22, resulting in a distinct reduction of the lifespan of the cell. However, since in the load pulses 32 according to the invention which lie between the charging pulses 31 these crystals are again immediately reduced due to the load, the negative effect of the crystals is cancelled.

This constitutes a major advantage of the charging method according to the invention. According to the inventive charging method as per FIG. 3 a charging pulse 31 of 5 A is employed during the pulse-charging phase, which may be approx. twice as great as the nominal charging current of 2.3 A for high-energy cells.

Apart from the raised current values during the charging pulses 31, a voltage is also applied or is admissible in the charging method according to the invention which is higher than the specified end-of-charge voltage $U_{Lmax}$, which is predefined for the respective cell and in the present case is specified to be 4.2V for the high energy cell. In this way the high current can be maintained up to the last charging pulse 31, which in comparison to the conventional charging method makes it possible for the cell to be charged to 100% or more within a very short time.

With other conventional charging methods the charging current used is kept constant, but this is lowered when the end-of-charge voltage $U_{Lmax}$ is reached. Due to the current sinking when the end-of-charge voltage $U_{Lmax}$ is reached, a distinctly higher charging time is required, in particular for charging the remaining 20% of capacity of a cell. With traditional charging methods the voltage moreover is measured during the interruption of the charging pulses. Because thus no load pulses are applied the crystals or dendrites formed during charging, which damage the separator 23, are not removed. Due to the fact that these crystals are not removed again, commonly used charging methods must never use a constant raised charging current and a voltage, which lies above the end-of-charge voltage $U_{Lmax}$.

There are also charging methods which use a continuously rising current for charging, wherein however a continuously rising charging current $I_L$ results in a degeneration of the cell, in particular if the cell is to be charged to 100%. Besides, a considerable rise in temperature has been observed.

Due to the charging method according to the invention, where a defined sink is used during the load pulse 32 in order to remove the crystals or dendrites and to counteract a temperature increase, it is possible, even when the end-of-charge voltage $U_{Lmax}$ is reached, to maintain the charging current $I_L$ during the charging pulses 31 and to charge the cell, even for a constant charging current $I_L$ and a voltage higher than the end-of-charge voltage $U_{Lmax}$. Due to the continuously removed crystals or dendrites during the load pulses a higher voltage and uniform current pulses can be employed, resulting in a drastic reduction of the charging time. Due to the short pulses a rise in temperature is avoided and the cell is charged in a very careful manner so that the lifespan of the cell is not impaired in any way, despite the higher voltage and current values.

Moreover there is almost no self-discharge due to the non-existent crystals, with the effect that a cell charged to 100% does not discharge when idle or when decoupled, and thus does not degenerate and even after years of storage can still develop its full capacity.

The signal characteristic according to FIG. 3 relates to a high-energy cell with a capacity of 2.3 Ah, an end-of-charge voltage $U_{Lmax}$ of 4.2V, a nominal voltage of 3.7V, an end-of-discharge voltage $U_{EL}$ of 3.0V, a nominal charging current $I_{Lmax}$ of 2.3 A and a maximum discharging current of 4.2 A and a continuous discharging current of 3.5 A.

Figure 4:
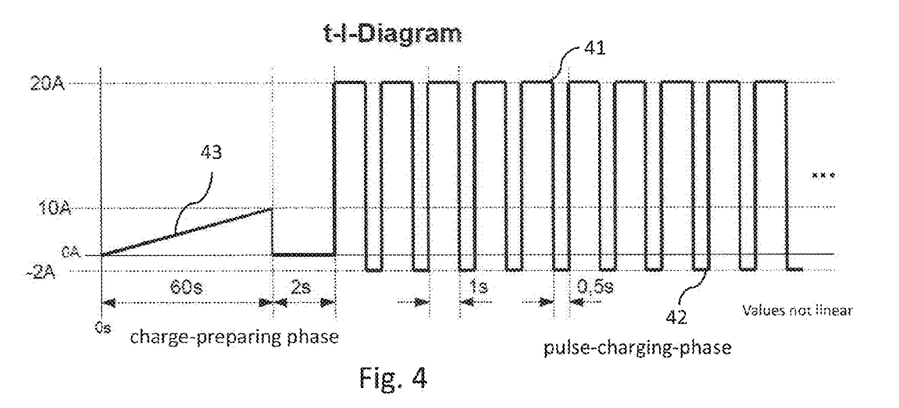
FIG. 4 shows a current characteristic of a pulse-charging method according to the invention for a high-current cell.

In FIG. 4 a charging method according to the invention for a high-current cell is shown which comprises a capacity of 2.3 Ah. Further characteristic data of the high-current cell is an end-of-charge voltage $U_{Lmax}$ of 4.1V, a nominal voltage of 3.3V, an end-of-discharge voltage $U_{EL}$ of 2.0V, a nominal charging current $I_{Lmax}$ of 10 A, a discharging current of max. 50 A and a continuous discharging current of 25 A.

In contrast to a charging method according to FIG. 3, with a high-current cell charging is carried out with a distinctly higher current of 20 A in absolute terms, during the charging pulses 41 in the pulse-charging phase. The load pulses 42 too between the charging pulses 41 are distinctly greater (2 A) in absolute terms.

Figure 5:
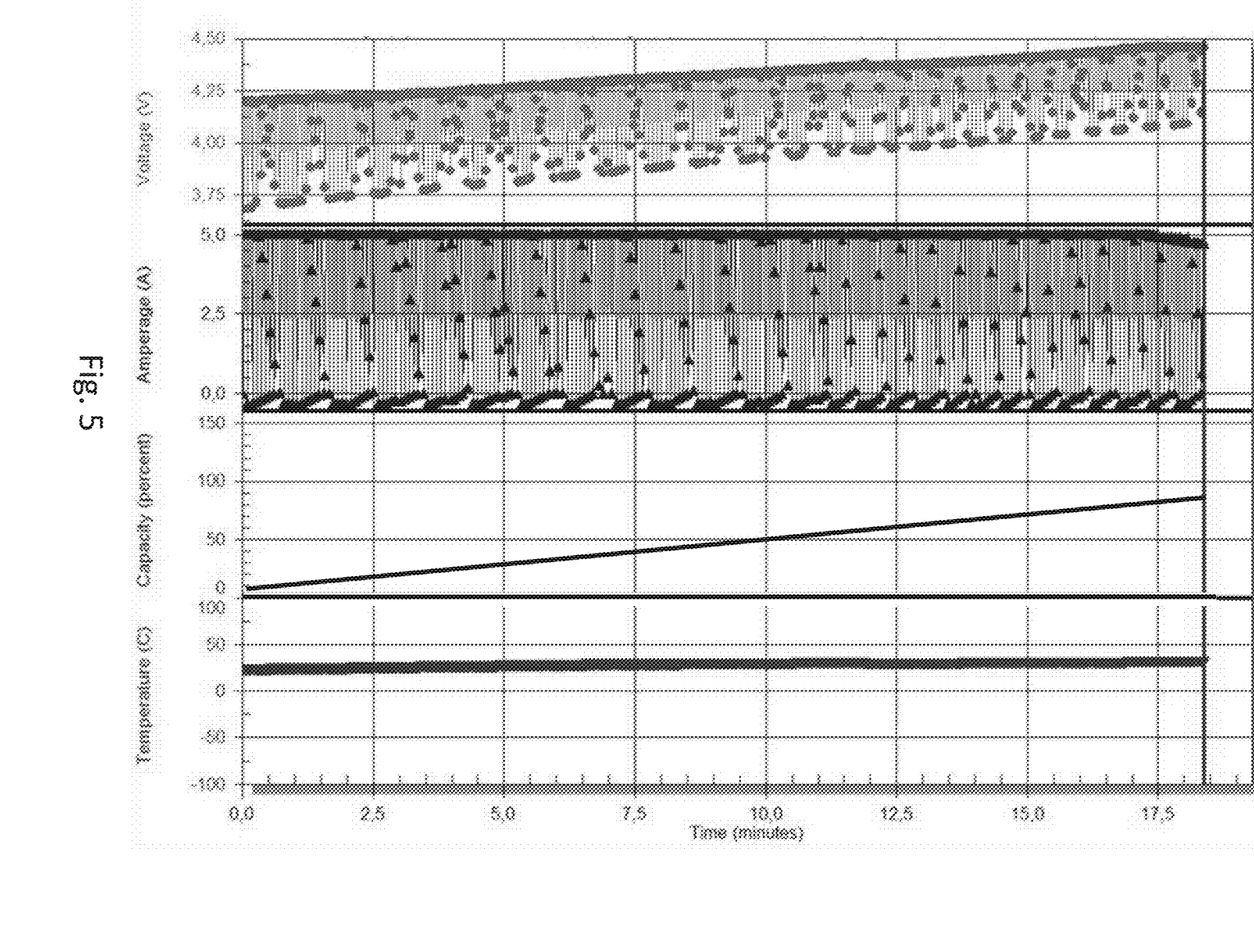
FIG. 5 shows a current, voltage and temperature characteristic of a further embodiment of the charging method according to the invention.

FIG. 5 shows a signal characteristic of voltage, current, capacity and temperature for a charging method according to the invention. According to FIG. 5 a lithium cell is fully charged during a time of approx. 18 minutes without the temperature of the cell rising. The temperature is shown in the lower part of FIG. 5 and remains in a region below 35° C. from start to finish of the charging operation. The current/voltage characteristic shows pulsing the cell with charging pulses of 5 A, wherein a charging pulse is followed by a load pulse which is smaller than 1 A, preferably the load pulses used are max. 300 mA. In the upper part of FIG. 5 the voltage is shown. At the start of the charging process the voltage present at the cell is below 3.7V, wherein during the first charging pulses the voltage $U_Z$ is initially below 4.2V. When looking at the voltage characteristic over the total time of the charging process, however, it can be seen that the voltage $U_Z$ at the cell reaches 4.25V after a relatively short time, approx. 2.5 min, which is above the end-of-charge voltage $U_{Lmax}$ of a lithium-ion cell.

With commonly used charging methods the current level during the charging pulses would be reduced. Due to the charging method according to the invention, in which extremely short charging pulses with amperages above the nominal charging current $I_{Lmax}$ are used, the voltage $U_Z$ at the cell can rise further even when exceeding the end-of-charge voltage $U_{Lmax}$ without the amperage in the charging pulses having to be reduced. It is thus possible to drastically reduce the charging time of the cell without the temperature rising or the cell degrading in some form or another. When reaching a voltage $U_Z$ of approx. 4.5V the current during the charging pulses start to reduce because a voltage $U_Z$ of approx. 4.1V was measured in several consecutive load pulses, which approx. corresponds to the max. end-of-charge voltage $U_{Lmax}$.

Further it can be recognised that both the height of the charging pulses and the height of the load pulses varies depending on the measured voltage $U_Z$ of the cell. One can see that for a rise in voltage during the load pulses the stress or the load current during the load pulses is successively reduced until the voltage during the load pulse is again within a specified range which follows the lower trend of the voltages. It is thus avoided that the temperature at the electrodes rises.

Figure 6:
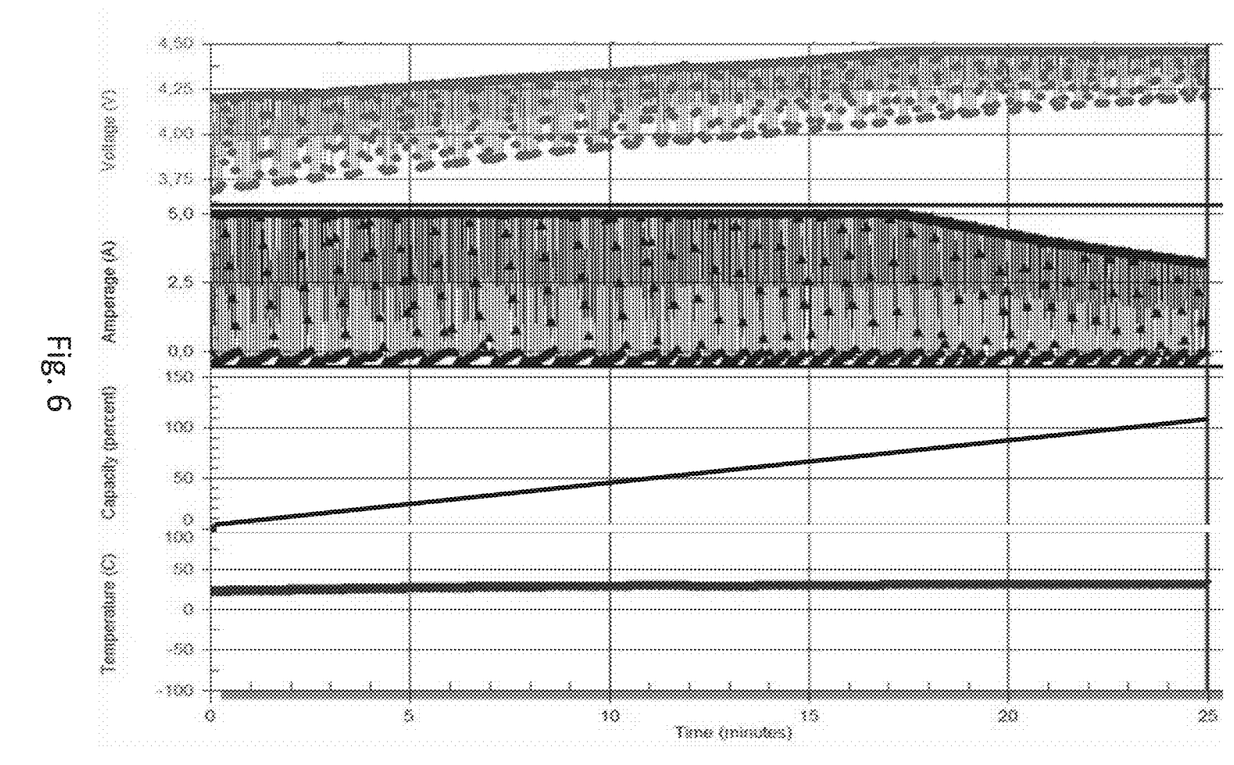
FIG. 6 shows a current, voltage and temperature characteristic of a further embodiment of the charging method according to the invention.

FIG. 6 shows a further signal characteristic of the charging method according to the invention. In this charging method a 100% charge of the cell is achieved over 25 minutes. Similar to the charging method according in FIG. 5 it can be recognised that the voltage rises relatively quickly above the end-of-charge voltage of 4.2V without then having to use a reduction of the current during the charging pulses. The charging pulses are not reduced until after approx. 17 minutes when the voltage $U_Z$ at the cell has reached 4.5V. After reaching a voltage of 4.5V a voltage of more than 4V is already present at the cell in the load pulses. I.e. the cell is almost fully charged. In order to avoid a further rise in temperature a start is made at a predefined voltage of 4.5V to reduce the amperage during the charging pulses wherein, however, the height of the load pulses is not changed. It can be clearly seen that the voltage $U_Z$ is rising further during the load pulses and reaches a value of 4.2V, which corresponds to the end-of-charge voltage $U_{Lmax}$ of the cell. With this signal characteristic also it can be recognised that the temperature of the cell hardly changes and, at any rate, does not rise beyond 35° C.

Figure 7:
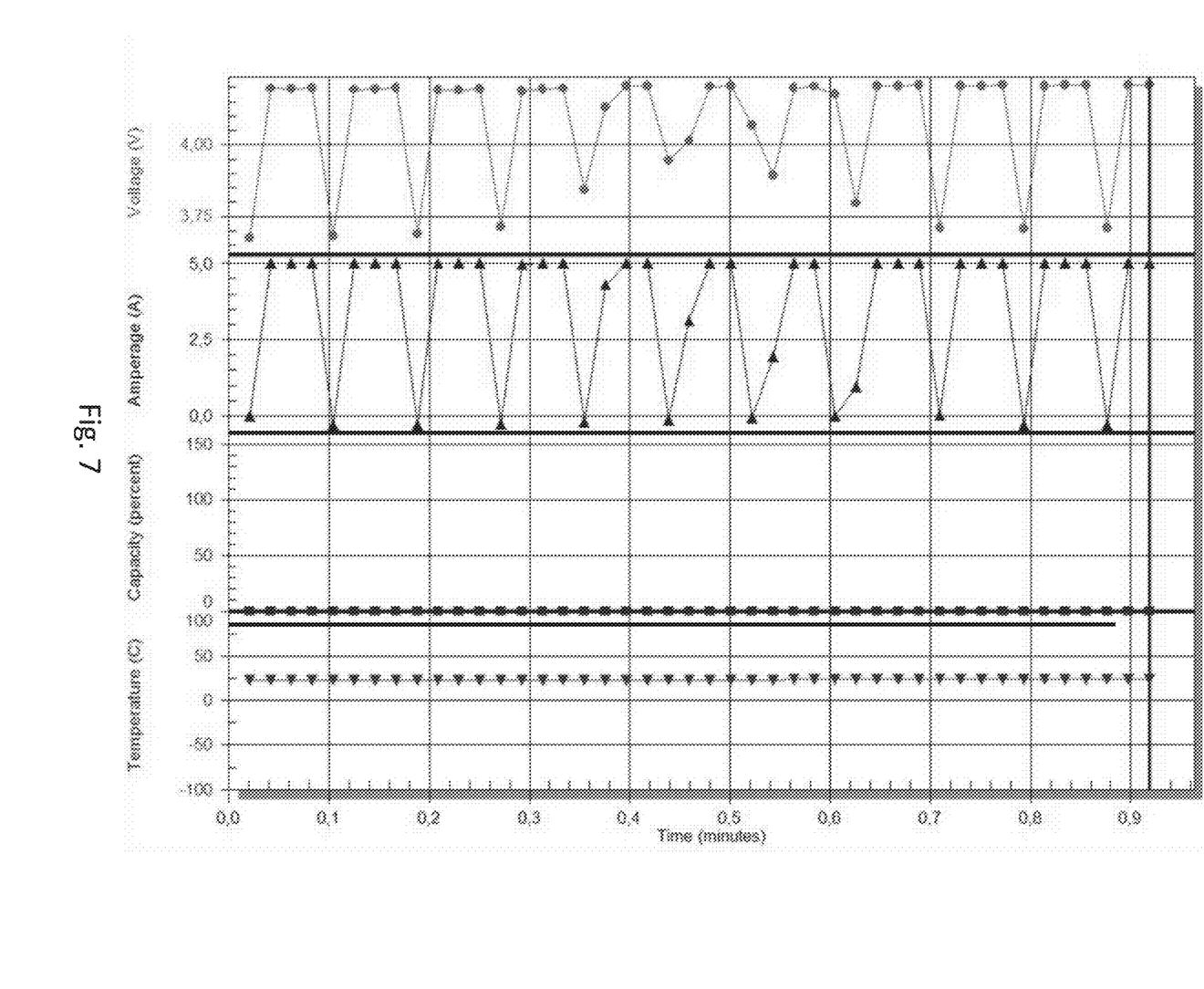
FIG. 7 shows a section of the current, voltage and temperature characteristic according to FIG. 5.

FIG. 7 shows a signal characteristic of current, voltage, capacity and temperature during a charging process. At the beginning of the pulse-charging phase a charging pulse of 5 A is applied, which in a high-energy cell corresponds to somewhat more than double that of the $I_{Lmax}$. The voltage $U_Z$ is measured during both the load pulses and the charging pulses. In the first charging pulse with 5 A a voltage $U_Z$ of approx. 4.2V is reached at the cell. The first charging pulse is followed by a first load pulse of less than 500 mA, preferably 300 mA, in which the cell is discharged. The current of the load pulses is approx. 3%-6% of the current during the charging pulses.

The view of FIG. 7 clearly shows that the height of the load pulses varies. In the middle part of the view it can be recognised that during a load pulse the voltage abruptly rises to initially 3.8V or just below 4V. This abrupt voltage rise is counteracted in that the subsequent load pulses are reduced in their amperage. Initially the load pulses are halved from 300 mA to 150 mA. Should the voltage rise further, it is also possible to apply a load pulse with amperages of less than 50 mA. After the height of the load pulses has been reduced, it can be recognised that the voltage $U_Z$ returns to the voltage trend during the load pulses resulting in the voltage during a load pulse lying again within a range of below 3.75V.

The view in FIG. 7 represents s section of time of a charging process according to FIG. 5 or 6, which however represents only 1 minute approx. Therefore no change can be detected either in the temperature or in the capacity.

Figure 8A:
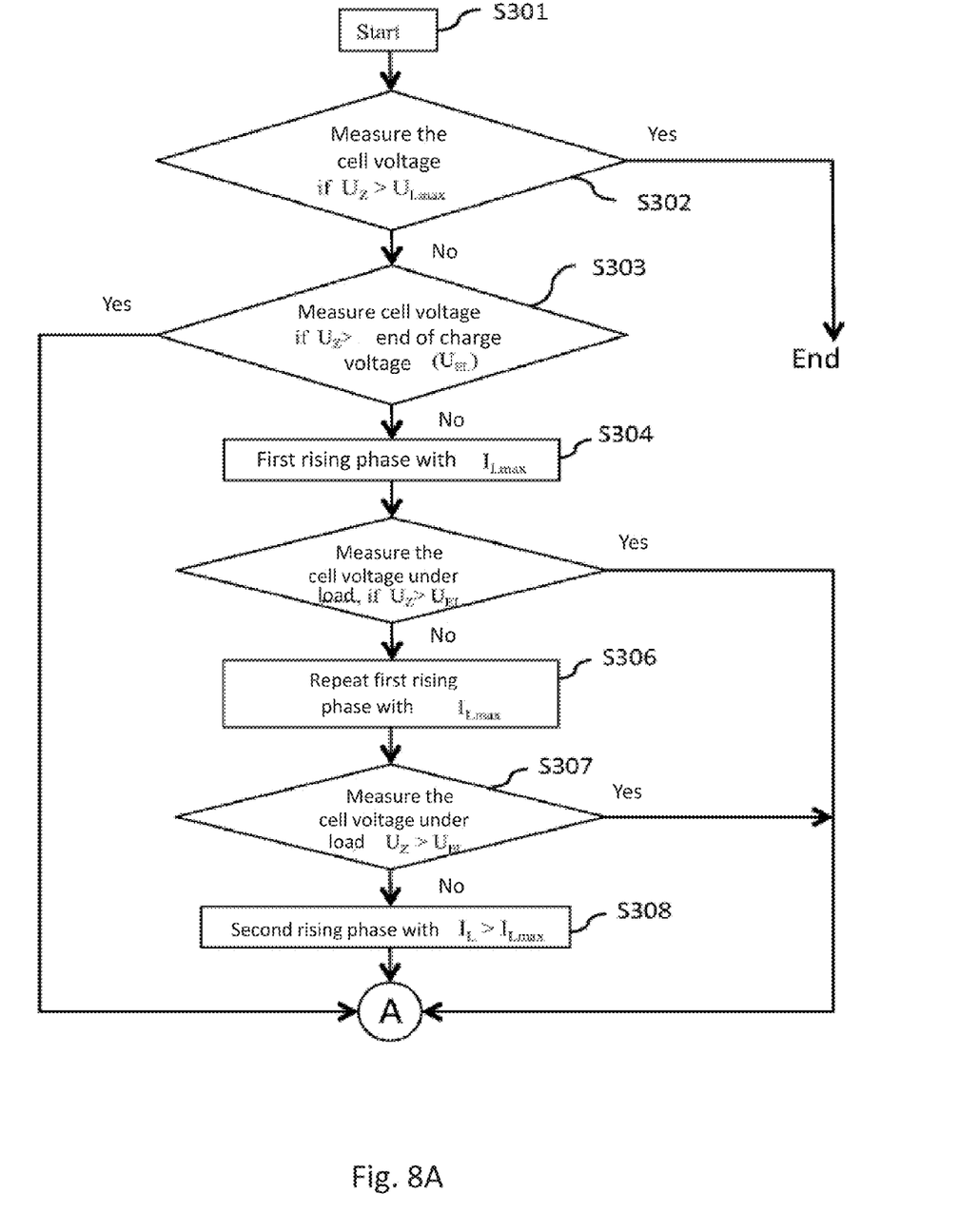
FIG. 8a, 8b show a flow diagram for a charging method according to the invention.
Figure 8B:
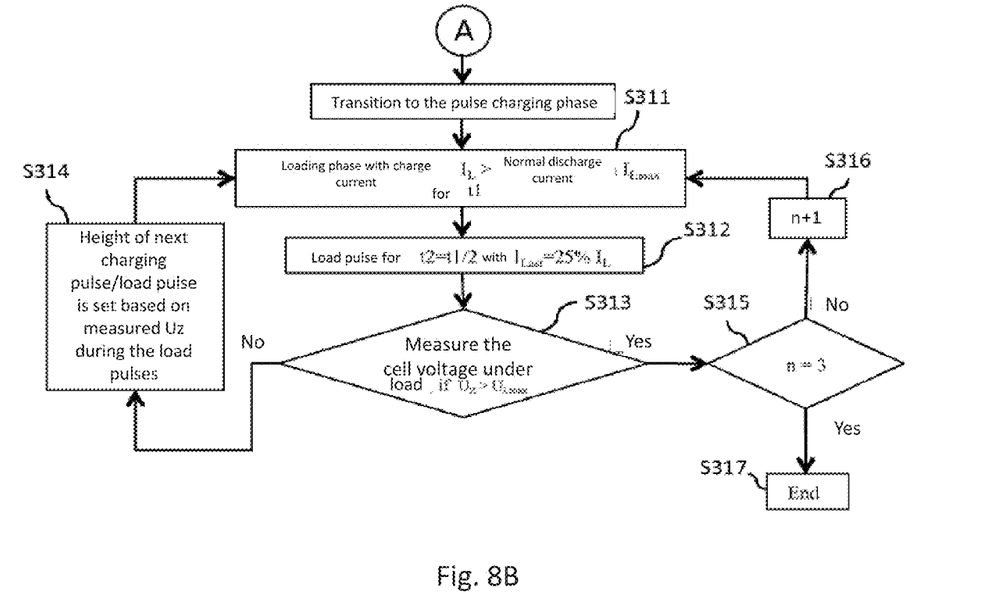

FIGS. 8a and 8b represent a flow diagram for a charging process according to the invention where both a charge-preparing phase and pulse-charging phase are carried out. After the charging process has been started in step S301, the voltage $U_Z$ at the cell is initially measured (S302). When the voltage $U_Z$ is greater than the end-of-charge voltage $U_{Lmax}$, i.e. when in the case of a high-energy cell more than 4.2V are present at the cell, the cell is fully charged, and the charging process is finished.

If the cell voltage $U_Z$ is less than the end-of-charge voltage $U_{Lmax}$, a check is carried out in step S303 to see whether the cell voltage is greater than an end-of-discharge voltage $U_{EL}$. The end-of-discharge voltage $U_{EL}$ of a high-energy cell is about 3V, that of a high-current cell about 2V. If the cell voltage $U_Z$ lies above the end-of-discharge voltage $U_{EL}$, the pulse-charging process according to FIG. 8b can be immediately continued. If however the cell has a voltage $U_Z$ which is less than the end-of-discharge voltage $U_{EL}$, a charge-preparing phase for activating the cell must be carried out.

Thus a first rising phase is performed in step 304. After the cell has been charged during the first rising phase, the cell voltage $U_Z$ is measured under load. In other words, the level of the voltage $U_Z$ at the cell under load is checked. If the voltage $U_Z$ is now greater than the end-of-discharge voltage $U_{EL}$ of 2V or 3V, depending on the cell used, the pulse-charging phase can be started. Otherwise a first rising phase is repeated in steps S306 or S307, wherein the voltage measurement is also repeated. Should, after repeating the first rising phase, the cell voltage still be below the end-of-discharge voltage $U_{EL}$, a second rising phase is carried out using a charging current $I_L$ of more than the nominal charging current $I_{Lmax}$ (S308). Even although not shown in FIG. 8a, it is checked after the end of the second rising phase, whether the cell voltage $U_Z$ has reached the end-of-discharge voltage $U_{EL}$. If the cell voltage $U_Z$, even after the second rising phase has still not reached the end-of-discharge voltage $U_{EL}$, the cell is defective and cannot be charged any further. The pulse-charging phase, which is shown in FIG. 8b, can only be started on condition that the end-of-discharge voltage $U_{EL}$ is reached. After the pulse-charging phase has been started, a charging pulse is initially applied for a time duration t1 with a charging current $I_L$, which is greater than the nominal charging current $I_{Lmax}$. Following the charging pulse a load pulse is applied which preferably is only half as long as the charging pulse and in which the cell is loaded with a discharging current $I_{Last}$ which is approx. 25% of the nominal charging current $I_{Lmax}$. During the load pulse the cell voltage $U_Z$ is measured and it is checked, whether the cell voltage $U_Z$ is greater than the end-of-charge voltage $U_{Lmax}$. Should the voltage $U_Z$ of the cell be already above the end-of-charge voltage $U_{Lmax}$, it is checked in steps S315 and S316/S317, whether the end-of-charge voltage has been reached three times. Should this be the case, the cell is fully charged. If in step S313 the cell voltage $U_Z$ is smaller than the end-of-charge voltage, the height of the next charging pulse/load pulse is set in step S314 based on the measured voltage $U_Z$ during the load pulses, and then the process is continued with steps S311/S312, as is evident in the signal characteristics of FIGS. 5, 6 and 7.

Figure 9:
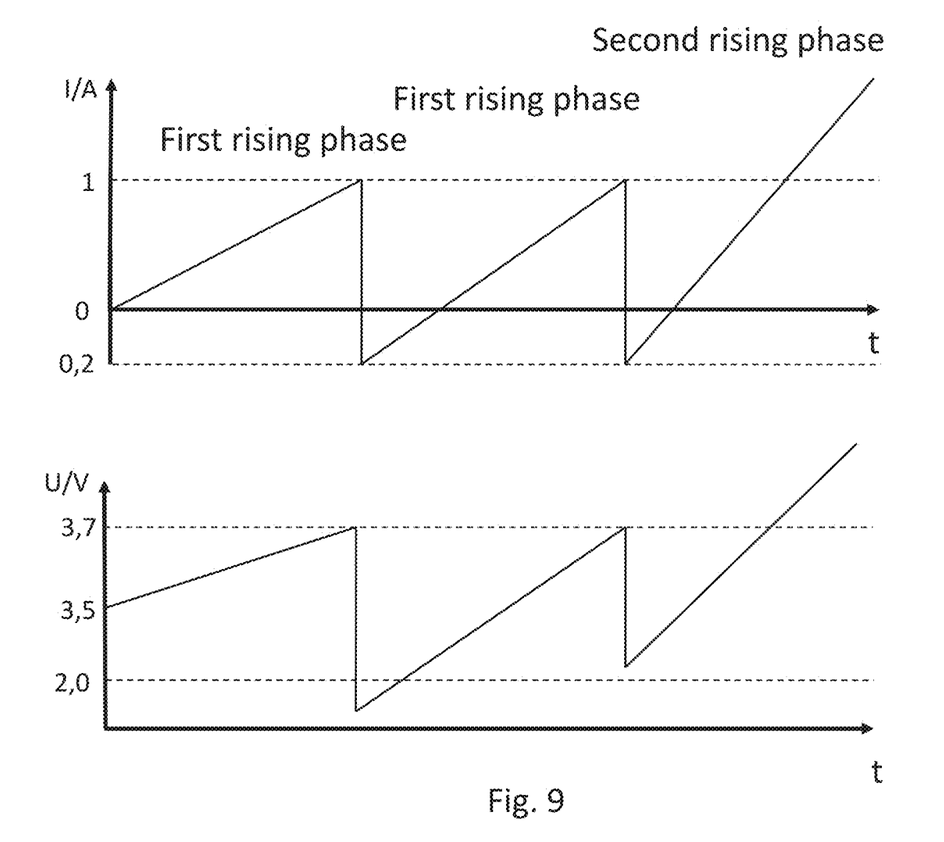
FIG. 9 shows an embodiment of a signal characteristic during the charge-preparing phase according to another embodiment.

FIG. 9 shows a detailed charge-preparing phase. In the upper part of FIG. 9 it can be recognised that the cell is initially charged with a linearly rising current up to an amperage of 1 A, wherein the voltage at the cell rises from approx. 3.5V to 3.7V during this time. During subsequent load application a voltage measurement is again carried out. After the first rising phase it can be recognised that the voltage $U_Z$ at the cell is below 2.0V which is less than the end-of-discharge voltage $U_{EL}$ for a high-current cell, so that a further first rising phase has to be performed because the pulse-charging phase can only be started on the basis of the end-of-discharge voltage $U_{EL}$. After repeating the first rising phase, another voltage measurement is carried out, which indicates that the cell, at the end of the repeat of the first rising phase, comprises a voltage of 2.1V, which is above the end-of-discharge voltage $U_{EL}$. Now, depending on the respective embodiment, a second rising phase can be carried out during which the cell is charged up to an amperage which lies above the nominal charging current $I_{Lmax}$. Alternatively it is possible to start the pulse-charging phase immediately.

Figure 10:
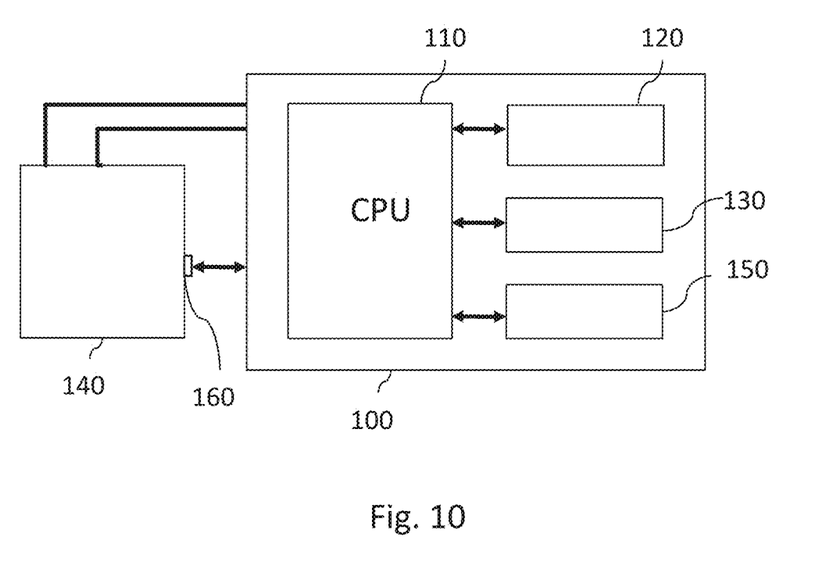
FIG. 10 schematically shows the construction of a charging device for applying the pulse-charging method according to the invention.

FIG. 10 shows a device for performing the charging method. Normally the device for performing the charging method is called a charging device. In contrast to conventional charging devices a charging device for performing the charging method is able to apply a defined sink/a defined load pulse to the cell. The charging device 100 is connected with the cell 140. The cell 140 is connected with a temperature sensor 160, which is coupled to the charging device 100 for continuous or periodic temperature monitoring. The charging device 100 comprises a CPU 110 which performs the charging method according to the invention. The CPU 110 is connected with a memory 120 and with a display 130 for outputting measured values. Further the charging device comprises an input unit 150 via which the charging method can be influenced. The memory 120 has various parameters stored in it for the charging process. For a certain cell, for example, this may be its characteristic data such as capacity, end-of-charge voltage, nominal voltage, end-of-discharge voltage, maximum charging current, maximum discharging current and continuous discharging current or only some of these. Based on these values the height of the charging pulses/load pulses is calculated. Also critical temperature values may be stored in the memory 120, related to the respective cell. The charging device may preferably be equipped with a detection device in order to identify the cell to be charged.

Similarly it is possible that the type of cell is entered via input means 150. The CPU 110 of the charging device, depending on the respective charging method, measures the voltage and/or the current in the charging/load pulses. Preferably the charging device 100 comprises at least one capacitor which is used for providing the charge for the charging pulse. Similarly it is possible to use the at least one capacitor for discharge during the load pulse, wherein the stored charged is then discharged via a resistance.

The invention claimed is:

1. A method for charging a lithium-ion based rechargeable cell, comprising:
pulsed charging the cell, wherein a charging current $I_L$, during the charging pulses, exceeds a maximal nominal charging current $I_{Lmax}$ of the cell by up to 5-times; and
discharging the cell between the charging pulses by load pulses, wherein the load pulses are shorter than the charging pulses, and
measuring a voltage $U_z$ of the cell during each load pulse;
checking whether the measured voltage $U_z$ of the cell is equal or greater than an end-of-charge voltage $U_{Lmax}$ of the cell;
finishing charging of the cell after the measured voltage $U_z$ of the cell at each of a predefined number of load pulses (n) corresponds to an end-of-charge voltage $U_{Lmax}$ of the cell, wherein n is greater than or equal to 1,
wherein a level of the charging current $I_L$ varies in consecutive charging pulses.

2. The method according to claim 1, wherein the charging current $I_L$, during the charging pulses, is more than 1.5 times the maximal nominal charging current $I_{Lmax}$ of the cell.

3. The method according to claim 2, wherein the charging current $I_L$ is twice the maximal nominal charging current $I_{Lmax}$ or greater.

4. The method according to claim 1, wherein a level of the charging current $I_L$, during the charging pulses and/or a height of the load pulses is dependent on a state of the cell.

5. The method according to claim 4, wherein the level of the current during the charging pulses and/or the load pulses is set depending on an internal resistance of the cell and/or a temperature of the cell.

6. The method according to claim 1, wherein a discharging current $I_{Last}$ is a maximum of 20-25% of the maximal nominal charging current $I_{Lmax}$ flows during a load pulse.

7. The method according to claim 1, a level of a discharging current $I_{Last}$ varies in consecutive load pulses.

8. The method according to claim 1, wherein on exceeding a predetermined voltage of the cell, the charging operation is terminated and/or wherein on exceeding a predetermined temperature ($T_{max}$) of the cell the charging operation is terminated.

9. The method according to claim 1, wherein depending on the measured voltage, a level of the charging current $I_L$ is set for the subsequent charging pulse, wherein if the measured voltage $U_z$ of the cell lies above a predefined value during the load pulse, the charging current $I_L$ is reduced in the next charging pulse.

10. The method according to claim 1, wherein depending on the measured voltage, the level of a discharging current $I_{Last}$ is set for the subsequent load pulse, wherein if the measured voltage $U_z$ of the cell lies above a predefined value during the load pulse, the discharging current $I_{Last}$ is reduced in the next load pulse.

11. The method according to claim 1, where a length of a load pulse corresponds to about one-half of a length of a charging pulse.

12. The method according to claim 1, wherein if the measured voltage $U_z$ of the cell reaches the end-of-charge voltage $U_{Lmax}$ during a load pulse, the charging current $I_L$ is reduced in the next charging pulse.

13. A device for charging a lithium-ion based rechargeable cell, comprising a controller configured to:
pulse charge the cell, wherein a charging current $I_L$, during the charging pulses, exceeds a maximal nominal charging current $I_{Lmax}$ of the cell by up to 5-times: and
discharge the cell between the charging pulses by load pulses, wherein the load pulses are shorter than the charging pulses, and
finish charging of the cell after a measured voltage UZ at each of a predefined number of load pulses (n) corresponds to an end of-charge voltage $U_{Lmax}$ of the cell, wherein n is greater than or equal to 1,
wherein a level of the charging current $I_L$ varies in consective charging pulses.

14. The device according to claim 13, further comprising a device for providing a sink in order to discharge the cell during the load pulses, wherein a size of the load pulse can be set.

15. The device according to claim 13, further comprising at least one capacitor to provide the load pulse and/or the charging pulse.

* * * * *